(12) United States Patent
Villalonga et al.

(10) Patent No.: US 10,765,897 B2
(45) Date of Patent: Sep. 8, 2020

(54) FIRE PROTECTION MATERIAL, HIGH-PRESSURE STORAGE TANK COATED WITH SAID MATERIAL, METHODS FOR PREPARING SAME, AND USES THEREOF

(71) Applicant: COMMISSARIAT A L'ENERGIE ATOMIQUE ET AUX ENERGIES ALTERNATIVES, Paris (FR)

(72) Inventors: Stephane Villalonga, Tours (FR); Fabien Nony, Monts (FR); Jean-Luc Yvernes, Veigne (FR); Francois Garonne, Saint Pierre des Corps (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 536 days.

(21) Appl. No.: 14/381,515

(22) PCT Filed: Feb. 28, 2013

(86) PCT No.: PCT/EP2013/054000
§ 371 (c)(1),
(2) Date: Aug. 27, 2014

(87) PCT Pub. No.: WO2013/127902
PCT Pub. Date: Sep. 6, 2013

(65) Prior Publication Data
US 2015/0008227 A1 Jan. 8, 2015

(30) Foreign Application Priority Data

Feb. 28, 2012 (FR) ..................... 12 51797

(51) Int. Cl.
*C08K 7/02* (2006.01)
*A62C 3/06* (2006.01)
(Continued)

(52) U.S. Cl.
CPC ............... *A62C 3/065* (2013.01); *B05D 5/00* (2013.01); *C09K 21/00* (2013.01); *C09K 21/14* (2013.01);
(Continued)

(58) Field of Classification Search
CPC ...... A62C 3/065; B05D 5/00; B05D 2254/02; B05D 2301/10; C09K 21/00; C09K 21/14; F17C 1/12; Y02E 60/321
(Continued)

(56) References Cited

U.S. PATENT DOCUMENTS 4,018,983 A * 4/1977 Pedlow ................. C08K 13/04
106/18.24
4,405,425 A 9/1983 Schiller et al.
(Continued)

FOREIGN PATENT DOCUMENTS

AT        1849       12/1997
CN     102040841      5/2011
(Continued)

OTHER PUBLICATIONS

Amico, E., Chem. Week (2008), Oct. 20, 2013, p. 23.
(Continued)

*Primary Examiner* — J. Gregory Pickett
*Assistant Examiner* — Niki M Eloshway
(74) *Attorney, Agent, or Firm* — Miles & Stockbridge, P.C.

(57) ABSTRACT

The present invention relates to a fire resistant material comprising a matrix of thermosetting elastomeric resin of the silicone resin type wherein endothermic fillers are incorporated as well as to a high pressure storage tank coated with said material, processes for the preparation thereof and uses thereof.

31 Claims, 1 Drawing Sheet

(51) Int. Cl.
*B05D 5/00* (2006.01)
*C09K 21/14* (2006.01)
*F17C 1/12* (2006.01)
*C09K 21/00* (2006.01)
*C08K 3/00* (2018.01)

(52) U.S. Cl.
CPC ............ *F17C 1/12* (2013.01); *B05D 2254/02* (2013.01); *B05D 2301/10* (2013.01); *Y02E 60/321* (2013.01)

(58) Field of Classification Search
USPC ..................... 220/560.01, 88.1; 524/401, 9
See application file for complete search history.

(56) References Cited

U.S. PATENT DOCUMENTS

| | | | | |
|---|---|---|---|---|
| 4,536,529 | A * | 8/1985 | Frye | C08K 5/0066 106/18.12 |
| 5,218,027 | A * | 6/1993 | Smith | C08K 3/22 524/265 |
| 5,654,356 | A * | 8/1997 | Namiki | C08K 3/04 524/413 |
| 5,922,799 | A * | 7/1999 | Sollradl | C08K 3/0058 521/85 |
| 6,167,827 | B1 * | 1/2001 | Keehan | B63B 11/04 114/74 A |
| 7,354,958 | B2 * | 4/2008 | Ohkoshi | C08K 3/22 252/601 |
| 7,563,855 | B2 * | 7/2009 | Jerschow | C08K 5/098 174/110 S |
| 2002/0006263 | A1 | 1/2002 | Mehl | |
| 2004/0055897 | A1 * | 3/2004 | Lessing | F17C 1/16 205/765 |
| 2007/0155850 | A1 * | 7/2007 | Shustack | C08K 3/105 522/6 |
| 2010/0186996 | A1 * | 7/2010 | Umezawa | C08G 59/4246 174/254 |
| 2012/0128959 | A1 * | 5/2012 | Fernando | B32B 7/12 428/219 |
| 2012/0232219 | A1 * | 9/2012 | Kato | C08L 83/04 524/862 |
| 2012/0241079 | A1 * | 9/2012 | Saitou | B32B 5/18 156/78 |
| 2012/0291878 | A1 * | 11/2012 | Pisot | F17C 1/06 137/315.01 |
| 2013/0129963 | A1 * | 5/2013 | Fernando | B32B 37/02 428/71 |

FOREIGN PATENT DOCUMENTS

| | | |
|---|---|---|
| EP | 2 182 198 A1 | 5/2010 |
| WO | WO 97/17570 A1 | 5/1997 |
| WO | WO 99/03792 | 1/1999 |

OTHER PUBLICATIONS

Weil et al., "Flame Retardants for Plastics and Textiles"; Practical Applications (Book) Hanser Publications, Cincinnati OH.
International Search Report dated Jun. 11, 2013, for International Application No. PCT/EP2013/054000.
French Search Report dated Nov. 1, 2012, for French Patent Application No. 1251797.
International Preliminary Report on Patentability dated Jun. 5, 2014, and Written Response thereto.
Dr. Neel Sirosh; "Hydrogen Composite Tank Program"; Proceedings of the 2002 U.S. DOE Hydrogen Program Review NREL/CP-610-32405; Quantum Technologies WorldWide, Inc.; pp. 1-7.
Mr. John Wozniak; Development of a Compressed Hydrogen Gas Integrated Storage System (CH-12-ISS) for Fuel Cell Vehicles; Johns Hopkins University Applied Physics Laboratory; May 20, 2003; pp. 1-4.

* cited by examiner

FIRE PROTECTION MATERIAL, HIGH-PRESSURE STORAGE TANK COATED WITH SAID MATERIAL, METHODS FOR PREPARING SAME, AND USES THEREOF

TECHNICAL FIELD

The present invention relates to the technical field of high pressure storage tanks and, more particularly, the field of fire protection of such tanks.

Indeed, the present invention provides a material enabling a high pressure storage tank to be protected against fire, said material being a matrix of thermosetting elastomeric resin comprising endothermic fillers.

The present invention also relates to a high pressure storage tank coated with such a material, a process for preparing this material or this coated tank and uses thereof.

STATE OF PRIOR ART

Despite the fact that flame retardants do not provide an absolute protection against fire, they have played an important role and still do in reducing fire occurrence and intensity.

Flame retardants represent an important family in the market of plastic additives and textile treatment, with estimated sales beyond 4 billion dollars for 2008. Flame retardants represent the most growing plastic additive family over the world (d'Amico, E., Chem. Week (2008) (October 13/20), p 23).

Presently, there are numerous flame retardant substances such as fire retardant fillers, intumescent systems or inert materials, numerous suppliers (for example more than one hundred are referenced in the book "Flame Retardants for plastics and textiles—Practical applications" by Edward D. Weil) as well as numerous applications.

However, there are only few works performed for high pressure storage tanks subjected to several hundreds bars. The state of the art presents few means and processes implemented to protect such tanks against fire.

International application WO 99/03792 entitled "Methods of making high-temperature glass fiber and thermal protective structures" published on Jan. 28, 1999 deals however with the protection of storage tanks against fire. The invention described therein relates to a glass fiber capable of resisting to temperatures higher than 1038° C. (i.e. 1900° F.), produced by treating a glass fiber with acids and then an organometallic material. The other fire resistant materials are based on the principle of bonding or incorporating in a substrate surface a fabric pre-coated with an active (intumescent or sublimating) material.

There is thus a real need for a material and processes enabling high pressure storage tanks to be protected against fire, which are easy to implement and which take into account requirements related to this type of tanks such as the storage and filling/emptying cycles thereof.

DISCLOSURE OF THE INVENTION

The inventors have resolved the above-explained technical problem by formulating a fire protecting material and its implementation in particular for protecting high pressure storage tanks against fire as well as aiding in protecting against impacts and a better integration in a storage system.

More particularly, the present invention relates to a fire resistant material comprising a matrix of thermosetting elastomeric resin wherein endothermic fillers are incorporated. Advantageously, the fire resistant material is only made up of a matrix of thermosetting elastomeric resin wherein endothermic fillers are incorporated.

With this material, the present invention not only allows a thermal protection to be provided to the high pressure storage tank on which the material is disposed, but also an additional protection to be provided against impacts and a great freedom of external shape that can be used to optimise the block (tank and protection) integration in the storage object. Thus, the formulation of the material according to the invention enables this material to have a triple function, a main function of thermal protection, and two further implicit functions of protection against impacts and conformability to have the best integration possible of the tank in a storage system.

By "matrix of thermosetting elastomeric resin", it is meant the base part of the material according to the invention which gives the shape to the same.

The notion of "thermosetting elastomeric resin" refers to a property of the resin/polymer which is reversibly deformable and which does not undergo damages such as fractures, non-elastic deformations or breakages, when deformed and which, when crosslinked, results in an insoluble and unmeltable material.

Any matrix of thermosetting elastomeric resin known to those skilled in the art is usable within the scope of the present invention. The matrix of thermosetting elastomeric resin implemented can be in particular selected from epoxyde resins, polyurethane resins and silicon resins. Within the scope of the present invention, the matrix of thermosetting elastomeric resin implemented is a silicon resin.

Advantageously, the matrix of thermosetting elastomeric resin implemented in the invention has a thickness between 100 μm and 10 cm, notably between 500 μm and 5 cm and, in particular, between 900 μm and 2 cm.

The advantages of the material according to the invention which result from the implementation of a matrix of thermosetting elastomeric resin such as a matrix of silicon resin are high in number. By way of examples of such advantages, one can mention:

- an elevated filler rate enabling a controllable and adjustable amount of endothermic fillers to be incorporated;
- modulable protection thickness and external shape enabling the resistance time of the material and the handleability and integrability to storage systems of the tank to be selected;
- a single piece structure requiring neither mounting no seal;
- a simple implementation which allows to have easily any type of conformable geometries and industrial rates by virtue of the casting in a mould or high pressure injection in a mould of the formulation according to the invention;
- a resistance to fatigue cycles of the high pressure storage tanks by virtue of its flexibility;
- reparability, removability, cutability, rebondability, replaceability or changeability.

Further, a silicon resin has the advantage of being non-combustible. Thus, under the effect of heat, this resin is degraded and is transformed into glass but does not burn.

In the material according to the present invention, endothermic fillers are incorporated, introduced, dispersed, coated and/or encapsulated in the matrix of thermosetting elastomeric resin such as previously defined.

An endothermic filler is a compound which, under the effect of heat, chemically reacts by producing most often water and thus cooling the structure. The volatile products of this chemical reaction also enable the combustion to be slowed down by decreasing the amount of flammable mixtures. Such a filler is also known as a "flame retardant".

Any endothermic filler known to those skilled in the art is usable within the scope of the present invention. However, those skilled in the art will prefer, upon implementing the present invention, avoiding flame retardants emitting toxic fumes.

The endothermic fillers implemented within the scope of the present invention can, more particularly, be selected from aluminium trihydroxide (ATH), disodium tetraborate decahydrate (or borax), trisodium phosphate dodecahydrate, magnesium dihydroxide (or Brucite), Colemanite, a melamine monophosphate, a melamine pyrophosphate, a melamine polyphosphate, zinc borate, hydromagnesite, a tripolyphosphate (TPP), resorcinol bis(diphenyl phosphate) (RDP), bisphenol-A bis(diphenyl phosphate) (BPADP) and mixtures thereof.

Still more particularly, the endothermic fillers implemented within the scope of the present invention are aluminium trihydroxide (ATH).

The amount of endothermic fillers will be defined by the user given that the use of a matrix of thermosetting elastomeric resin enables low as well as high amounts of endothermic fillers to be used. Advantageously, the amount of endothermic fillers expressed in weight with respect to the total weight of the material of thermosetting elastomeric resin is between 10% and 90%, in particular between 15% and 80% and, in particular between 40% and 70%.

The present invention also relates to a process for preparing a material according to the present invention. This process advantageously comprises the following steps of:

a) preparing a mixture comprising at least one precursor of the thermosetting elastomeric resin (i.e. a precursor of the silicone resin) and at least one endothermic filler;

b) optionally outgassing the mixture obtained in step (a);

c) adding, to the mixture obtained in step (a) or to the outgassed mixture obtained in step (b), an agent enabling said thermosetting elastomeric resin to be obtained from said precursor;

d) optionally outgassing the mixture obtained in step (c);

e) shaping the mixture obtained in step (c) or the outgassed mixture obtained in step (d), whereby a material according to the present invention is obtained.

During step (a) of the process according to the present invention, those skilled in the art will be able to determine which precursor(s) to implement as a function of the desired thermosetting elastomeric resin, the filler(s) used, the filler rate and the shaping process contemplated such as, by way of non-limiting examples, casting, coating, injection and vacuum assisted transfer. Such a precursor can be a monomer, a mixture of different monomers, an oligomer, a mixture of different oligomers, a prepolymer, a mixture of different prepolymers, a non-crosslinked polymer, a mixture of different non-crosslinked polymers or a mixture thereof.

Further, in the mixture as prepared in step (a) of the process according to the invention, the endothermic filler(s) is (are) advantageously added to the precursor(s) of the thermosetting elastomeric resin. More particularly, they are gradually incorporated so as to obtain a dispersion as homogeneous as possible.

The precursor(s) of the thermosetting elastomeric resin is (are) advantageously used, during step (a) of the process according to the invention, in liquid form. When several different precursors of the thermosetting elastomeric resin are used, they can be mixed at once or be added one after the other or by group, so as to form a $1^{st}$ mixture in which the endothermic filler(s) is (are) added.

Likewise, the endothermic filler(s) can be used during step (a) of the process according to the invention, as a solid or liquid.

The mixing during step (a) is performed with stirring using a mixer, and can be implemented at an initial temperature between 10 and 80° C., advantageously between 12 and 50° C., in particular between 15 and 25° C. and, more particularly, at room temperature (i.e. 23° C.±5° C.).

The mixture obtained as a result of step (a) can be in a liquid form or slurry form. Advantageously, the mixture obtained as a result of step (a) is a liquid mixture.

The optional outgassing during step (b) allows the removal, if need be, of the air introduced, during step (a), into the liquid mixture.

Any technique known to those skilled in the art to outgas a solution can be used during step (b) of the process according to the invention. Advantageously, the outgassing during step (b) of the process according to the present invention is selected from a vacuum outgassing in particular by placing the mixture of step (a) under reduced pressure, by stirring it under reduced pressure and/or by sonicating it under reduced pressure; an outgassing by ultrasonication of the mixture of step (a). More particularly, the outgassing during step (b) of the process according to the present invention is a vacuum outgassing.

All that has been previously indicated for outgassing of step (b) of the process according to the invention is applicable mutatis mutandis to outgassing of step (d) of the same process.

During step (c) of the process according to the present invention, those skilled in the art will be able to determine which agent(s) to implement as a function of the desired thermosetting elastomeric resin and the precursor(s) used during step (a). Such an agent can be a polymerisation catalyst, a polymerisation activator, a crosslinking agent or a mixture thereof.

The agent(s) implemented during step (c) of the process according to the present invention can be used, in liquid form or in solution in a suitable solvent. When several different agents are used, they can be mixed together before being added to the mixture obtained in step (a) or step (b) or be added one after the other or by group to the mixture obtained in step (a) or step (b).

The mixing during step (c) is performed with stirring using a mixer or a homogenizer, and can be implemented at an initial temperature between 10 and 90° C., advantageously between 12 and 60° C., in particular between 15 and 30° C. and more particularly at room temperature.

The mixture obtained as a result of step (c) or as a result of step (d) is herein called "formulation" and is distinguished from the material according to the present invention by the fact that it is not shaped.

Step (e) of the process according to the present invention corresponds to this shaping. The latter is advantageously implemented by casting into a mould the mixture obtained in step (c) or the outgassed mixture obtained in step (d) or by injecting under pressure into a mould the mixture obtained in step (c) or the outgassed mixture obtained in step (d) or by vacuum assisted transfer into a mould of the mixture obtained in step (c) or the outgassed mixture obtained in step (d). The moulds implemented can enable the entire tank to be covered with the formulation in one step (full mould) or only half the tank to be covered therewith, requiring the repetition of step (e) for the other half tank to be covered. In spite of the repetition of step (e), this alternative offers the advantage of an easier mould-release.

These casting or high pressure injection or vacuum assisted transfer techniques are known to those skilled in the art. Step (e) of the process enables the material according to the invention to be provided with the desired external shape. The latter is fully modulable for example a coating having a thickness substantially identical and taking on the exact external shape of the tank to be protected or, for locally protecting sensitive zones by higher thicknesses or, alternatively, a parallelepiped structure adapted to fit protected tanks against each other and advantageously fill free spaces with the formulation providing increased fire, impact and vibration resistance.

Likewise, the casting or high pressure injection or vacuum assisted transfer techniques are cold techniques (liquid way) without heating which enable the material according to the invention to be used as an additional coating in particular of a tank and, specially, of a high pressure storage tank.

The present invention relates to the use of a material according to the present invention or likely to be prepared according to a process according to the invention to protect a high pressure storage tank against fire.

By "high pressure storage tank", it is meant, within the scope of the present invention, a tank containing a pressurised fluid and, in particular, a pressurised gas. Such a tank can in particular be a composite tank such as a IV type tank.

By "high pressure", it is meant a fluid and in particular a gas at a pressure higher than atmospheric pressure, in particular higher than 100 bars, advantageously equal to or higher than 200 bars and, in particular between 200 and 2,000 bars. The gas stored in the tank according to the invention is in particular natural gas, compressed air, a neutral or inert gas, nitrogen, argon, hydrogen gas, helium, oxygen or a mixture thereof.

By "protect against fire" or "protect from fire", it is meant that the material according to the present invention enables the high pressure storage tank to be protected during a fire in order to retard or even to avoid bursting thereof.

The present invention further relates to a high pressure storage tank all or part of the external surface of which is covered with a fire resistant material such as previously defined or likely to be prepared according to a process as previously defined.

In a 1$^{st}$ implementation, the entire external surface of the high pressure storage tank is covered or coated with a material according to the invention. By "material according to the invention", it is meant both a fire resistant material as previously defined and a material likely to be prepared according to a process as previously defined.

In a 2$^{nd}$ implementation, only a part of the external surface of the high pressure storage tank is covered or coated with a material according to the invention.

In this 2$^{nd}$ implementation, the zone(s) non-covered by the material according to the invention is (are) either let as such, i.e. non-coated, or coated with a material, different from the material according to the invention, and, in particular, with a meltable/fusible material. Thus, within the scope of the present invention, a part of the external surface of the high pressure storage tank is covered with a meltable material.

By "meltable/fusible material", it is meant a material, also known as a "hot-melt material", which is likely to be liquefied, i.e. melt under the effect of heat and/or the melting point of which is relatively low. Such a material is thus incapable of protecting the wall of the high pressure storage tank against heat. Those skilled in the art know different meltable materials usable within the scope of the present invention. By way of particular examples of such meltable materials, thermoplastic materials and metal alloys or compounds having a low melting point can be mentioned. In particular, the meltable materials will be selected from low melting point thermoplastic materials such as polyolefins and, more particularly, polyethylene.

At the surface of the high pressure storage tank, the zone(s) of the meltable material can be provided in a random or orderly way, as parallel or intersecting strips, along the axis or the circumference of the tank. FIG. 1 presents different possibilities as to the arrangement of the meltable material at the surface of a tank according to the invention.

This 2$^{nd}$ implementation offers the advantage, in particular in the case of storage tanks the structure of which is of one (or more) meltable material(s), increasing the protecting effect of the material according to the invention by further avoiding or retarding tank bursting. Indeed, in case of fire, the zones at which the coating is not protective (i.e. zones without coating or with a coating of meltable material) and the zones most exposed to heat melt or are quickly degraded. Thus, the tank wall can be locally damaged by the fire, allowing it to be locally degraded and/or melted and, as a result, the tank can leak as soon as possible through these zones by minimising mechanical explosion risks. The rest of the coating of the material according to the invention is protective and enables the rise in pressure of the tank to be retarded.

Should the material according to the invention cover all or part of the surface of the high pressure storage tank and should this surface further have coating zones by a meltable material, the tank can further be covered with one (or more) further protection(s), the latter being provided above all or part of the material according to the invention and/or all or part of the meltable material.

Thus, all or part of the external surface of the tank according to the present invention (i.e. coated with the fire resistant material according to the invention and possibly with a meltable material) is further covered with an intumescent substance such as an intumescent paint or varnish. An intumescent substance swells with heat at temperatures higher than 200° C. Consequently, it enables sub-layers, including the tank, to be protected from thermal radiations. The total protection duration also depends on the thickness deposited and the heat power received by the protection. There is a synergy between use and structuration of the fillers used, i.e. a synergy between the material according to the present invention and the intumescent substance. By "intumescent substance", it is meant, within the scope of the present invention, an intumescent varnish, paint or coat.

Generally, an intumescent system is comprised of three ingredients which are (1) an acid source which promotes dehydration of the char agent; (2) a char agent, generally a macromolecule having hydroxyl groups and (3) a blowing agent, which decomposes and releases a neutral gas, resulting in the expansion of the polymer, the main component of the paint or varnish and in the formation of a layer consisting in very numerous hollow cells.

Any substance known to those skilled in the art is usable within the scope of the present invention. By way of illustrating and non-limiting examples, products marketed by Artech, Chenguang, Clariant, Comus, Dahiachi, Thermal Science Inc., Innovative Fire Systems, Comus®, ITAC or Lurie companies can be mentioned.

In the case also of a tank covered with a material according to the present invention and an intumescent substance, at least one zone of intumescent substance is replaced by a meltable material as previously defined. Advantageously, at least one zone of the fire resistant material and at least one zone of intumescent substance are replaced by an identical meltable material or by different meltable materials. In particular, at least one zone of the fire resistant material replaced by a meltable material and at least one zone of intumescent substance replaced by a meltable material are overlapping. More particularly, all the zones of the fire resistant material replaced by a meltable material and all the zones of the intumescent substance replaced by a meltable material are overlapping in twos.

The presence of a meltable material together with a fire resistant material possibly coated with an intumescent substance offers an increased protection of the high pressure storage tanks. This increased protection of the tanks enables the reliability of thermal fuses possibly present on the storage system to be substantially increased by offering a wider triggering range to depressurise the tank and avoid any explosion.

Alternatively, all or part of the external surface of the tank according to the present invention is further covered with a fire inert insulating material and in particular a fabric or sock of fire inert insulating material. Indeed, such a material is non-flammable, insulating and can be used on the material according to the present invention to maximise the fire protection of the tank. It can also be used on all or part of the tank at least one part of which is coated with the material according to the present invention. The layer of fire inert insulating material can also be covered with a layer of intumescent substance.

For the fire inert insulating material, basalt, mica, glass, carbon and silica can be mentioned. The fire inert insulating material implemented within the scope of the present invention is produced from fibres of such a material as, for example, silica wool.

A $1^{st}$ alternative consists in draping, with fabrics of fire inert insulating material, the tank coated with a material according to the invention and possibly adding, onto the fire inert insulating material, an intumescent substance. The fabrics of fire inert insulating material are cut off to be conformable to the shape of the tank and then draped about the tank. They can be sewn to be held about the tank or held with rings.

A $2^{nd}$ alternative consists in manufacturing a sock of fire inert insulating material and, once it is manufactured, slipping it about the tank. The use of a sock enables the tank to be fully covered while keeping in contact thereof. Further, it can be easily removed and/or exchanged.

Any substance based on a fire inert insulating material known to those skilled in the art is usable within the scope of the present invention. By way of illustrating and non-limiting examples, products marketed by Industry 3R Inc. company can be mentioned.

Like the intumescent substance, the fire inert insulating material plays a synergic role with the fire resistant material possibly combined with a meltable material in protecting the high pressure storage tank against fire.

In summary, a storage tank according to the present invention can be:
  a high pressure storage tank wholly covered with a fire resistant material according to the present invention;
  a high pressure storage tank partly covered with a fire resistant material according to the present invention and the zone(s) non-covered by the fire resistant material according to the present invention is (are) covered with a meltable material as previously defined;
  a high pressure storage tank wholly or partly covered with a fire resistant material according to the present invention and, in the case where the fire resistant material according to the present invention partly covers the tank, the zone(s) non-covered with the fire resistant material according to the present invention is (are) covered with a meltable material as previously defined; the thus coated tank being wholly or partly covered with an intumescent substance as previously defined;
  a high pressure storage tank wholly or partly covered with a fire resistant material according to the present invention and, in the case where the fire resistant material according to the present invention partly covers the tank, the zone(s) non-covered by the fire resistant material according to the present invention is (are) covered with a meltable material as previously defined; the thus coated tank being wholly or partly covered with a fire inert insulating material as previously defined;
  a high pressure storage tank wholly or partly covered with a fire resistant material according to the present invention and, in the case where the fire resistant material according to the present invention covers partly the tank, the zone(s) non-covered with the fire resistant material according to the present invention is (are) covered with a meltable material as previously defined; the thus coated tank being wholly or partly covered with a fire inert insulating material as previously defined; the fire inert insulating material being wholly or partly covered within an intumescent substance as previously defined.

The present invention provides those skilled in the art with an adjustable architecture depending on the specifications of the tank with the use of a fire resistant material according to the invention and at least one other material selected from the intumescent substance, the fire inert insulating material and the meltable material as previously defined.

The present invention also relates to a process for preparing a storage tank which is protected against fire as previously defined. This process can be implemented on a high pressure storage tank empty or previously filled with the fluid and in particular the pressurised gas.

Thus, the process according to the present invention comprises a step of applying, on all or part of the surface of the high pressure storage tank, a fire resistant material as previously defined or prepared according to a process as previously defined. The application of the fire resistant material advantageously corresponds to step (e) as previously defined.

The process according to the present invention can further comprise an additional step of applying, on all or part of the surface of the tank coated by the fire resistant material according to the present invention, an intumescent substance as previously defined. This application can be implemented by means of a paintbrush, a roll, vaporisation or spraying.

The process according to the present invention can include an additional step of replacing at least one zone of the fire resistant material optionally coated with an intumescent substance by a meltable material. Three different alternatives may be contemplated for this additional step.

In a $1^{st}$ alternative, following the application of the fire resistant material and possibly following the application of the intumescent substance, the tank all or part of the surface of which is coated with a fire resistant material and possibly with an additional layer of intumescent substance can undergo a treatment aiming at removing one (or more)

zone(s) of the fire resistant material optionally coated with the intumescent substance and optionally at replacing it/them by a meltable substance as previously defined.

Thus, following the application of the fire resistant material and optionally following the application of the intumescent substance, at least one zone of the fire resistant material optionally coated with the intumescent substance is removed and possibly replaced by a meltable substance. In view of the nature of the meltable fire resistant material, the removal during this step is made by simply cutting off the material possibly coated with the intumescent substance.

Those skilled in the art will be able to select the technique of applying the meltable substance in replacement of the removed zones. By way of illustrating and non-limiting examples, an application by paintbrush, roll, vaporisation or by application of a fabric coated with a meltable material such as previously defined can be mentioned.

In a $2^{nd}$ alternative, before the application of the fire resistant material and possibly before the application of the intumescent substance, the tank can undergo a prior treatment aiming at occupying one (or more) zone(s) of its surface by a meltable substance as previously defined.

In view of the nature of the meltable fire resistant material, the addition of the meltable material during this step is made by simple adhesive bonding or castings of the meltable material. Those skilled in the art will be able to select the technique of application of the meltable substance into the selected zones. By way of illustrating and non-limiting examples, an implementation of the meltable material by adhesive bonding one or more parts cut off at the desired shape, casting, injection or transfer of the meltable material into a mould having the desired shape can be mentioned.

Once the meltable material is positioned, the zones of the tank not covered by the meltable material are coated with a layer of fire resistant material and possibly with an additional layer of intumescent substance.

In a $3^{rd}$ alternative, before the application of the fire resistant material and possibly before the application of the intumescent substance, the tank can undergo a prior treatment aiming at occupying one (or more) zone(s) of its surface by a product different from a meltable substance. This substance plays the role of a mask and is advantageously selected not to have an affinity with the surface of the tank, thereby making its subsequent removal easier. By way of example, such a mask can be a fabric piece or strip.

Once the mask is positioned, the zones of the tank non-covered by this mask are coated with a layer of fire resistant material and possibly with an additional layer of intumescent substance. Then, the mask is removed by pulling out or peeling off, thus releasing a zone which is then filled with the meltable material as previously described and according to any techniques contemplated within the scope of the $1^{st}$ alternative (i.e. cutting off the material possibly coated with the intumescent substance).

The process according to the present invention can also comprise an additional step of coating the tank all or part of the surface of which is coated with a fire resistant material and optionally a meltable material with a fire inert insulating material as previously defined. The techniques as for the coating the tank with the fire inert insulating material will depend on the shape of the latter, i.e. fabric of fire inert insulating material or sock of fire inert insulating material or filament winding and are as previously defined. Once the fire inert insulating material is positioned, it can be coated, wholly or partly, within an intumescent substance as previously defined.

Finally, in the process according to the present invention, prior to applying the fire resistant material and possibly the meltable material onto the tank and/or prior to applying the intumescent substance onto the fire resistant material and possibly onto the meltable material or onto the fire inert insulating material, the tank, fire resistant material, meltable material and/or fire inert insulating material can undergo a treatment making anchoring of the fire resistant material, meltable material and/or intumescent substance easier by adding an adhesion primary coat and/or by an adequate surface treatment. In other words, an adhesion primary coat and/or an adequate surface treatment is applied on all or part of the surface of the tank and/or all or part of the surface of the tank coated with the fire resistant material, with the meltable material or with the fire inert insulating material.

By "adhesion primary coat", it is meant a coating which enables bonding, anchoring or adhesion of the fire resistant material, meltable material and/or intumescent substance to be improved. Different adhesion primary coats exist in the state of the art. Those skilled in the art will be able to select which one to use depending on the nature of the surface of the high pressure storage tank, the nature of the fire resistant material and, in particular, on the thermosetting elastomeric resin comprising it, on the meltable material and/or on the intumescent substance. He/she will also be able to select if need be an adequate surface treatment. By way of illustrating and non-limiting examples, the following adhesion primary coats can be mentioned: WACKER G790,G783, FD, DOW-CORNING 1200OS,1205,P, GE SILICON SS4004, PRIMAIRE RHODIA RHODORSIL, PM820, Organosilanes, Organotitanates, Organophosphates . . . .

Further characteristics and advantages of the present invention will be more apparent to those skilled in the art upon reading examples below given by way of illustrating and non-limiting purposes, and referring to the appended figures.

DETAILED DISCLOSURE OF PARTICULAR EMBODIMENTS

I. Material

The material according to the present invention has been prepared from silicone forming the thermosetting elastomeric resin matrix and ATH as an endothermic filler.

ATH is largely used in numerous applications for cost reasons and acts by endothermally decomposing at temperatures between 80 and 200° C., which results in lowering the temperature of the material and thus decreasing its degradation rate. Further, its decomposition releases water vapour which dilutes flammable mixtures and forms a shield to penetration of oxygen to the surface of the material.

ATH and silicone used in the present embodiment are ATH SH150 Rio Tinto Alcan and Elastosil RT601 resin respectively from Wacker Chemie AG.

II. Process for Preparing the Material According to the Invention

The formulation consists in performing the following steps:

the resin is weighed, 360 g, and then placed in a container under a mixer;

the fillers are weighed, 600 g, and then incorporated little by little into the resin using the mixer propeller.

This step is quite essential because the dispersion of the fillers needs to be as homogeneous as possible. The higher the filler level, the more difficult the dispersion.

Once the resin-fillers mixture is obtained, a first outgasing may be necessary.

Indeed, upon adding fillers, the propeller incorporates in the mixture an amount of air that should be removed from the mixture for the subsequent implementation.

Once the mixture is outgassed, the adequate amount of hardener, 40 g, is to be weighed and the mixture is to be mixed again to be homogeneous.

A second outgassing can then enable air bubbles incorporated during the second mixing to be removed.

Once this last step is ended, a formulation is obtained, that is a finished product which requires to be shaped by casting.

III. Shaping the Material According to the Invention

The implementation on a tank consists in casting the formulation obtained in point II into the bottom of a mould.

The bottle shaped high pressure storage tank is then placed and pushed into this formulation, the material then being distributed on half the tank. The material is then allowed to polymerise at room temperature or in an oven to have a tank protected on half a surface.

Figure 1:
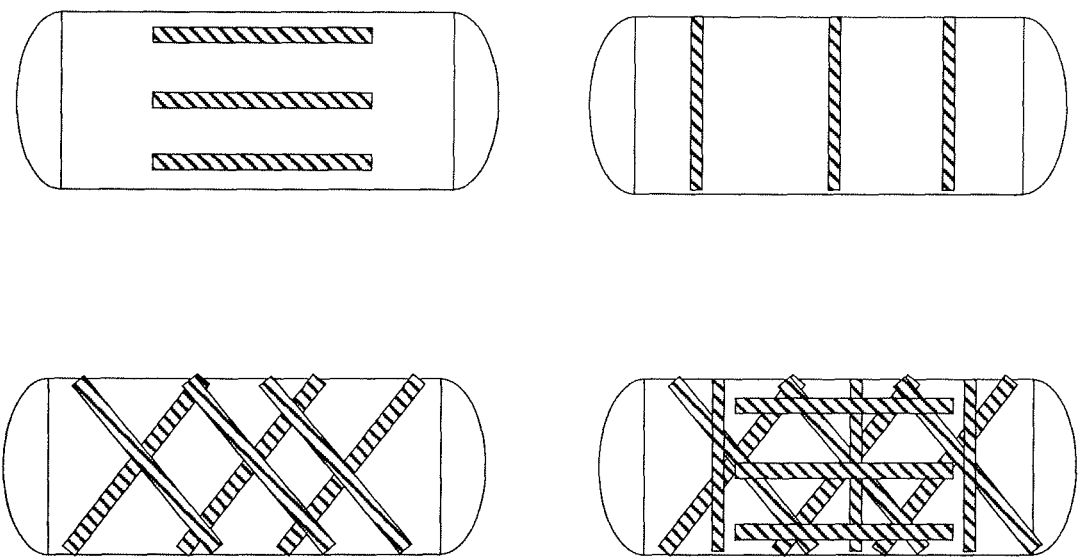
FIG. 1 presents different ways to provide at the surface of the high pressure storage tank, a meltable coating, non-fire protecting (cross-hatched zone) enabling the tank to be locally leaked to minimise its maximum pressure at the beginning of a leak and minimise any explosion.
Figure 2:
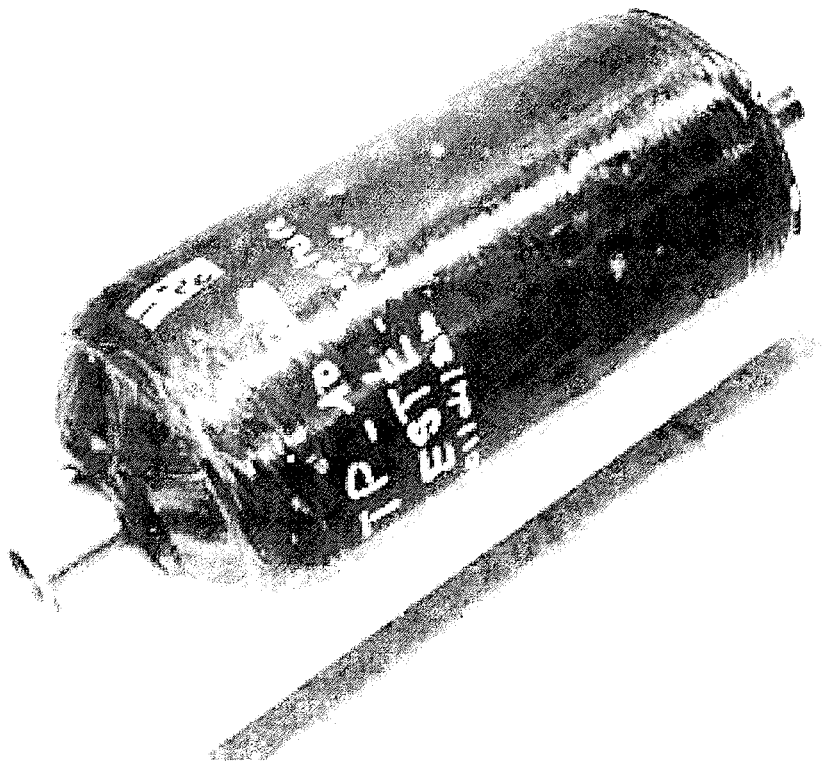
FIG. 2 is a photograph of a high pressure storage tank coated with a fire resistant material according to the invention.

The process should then be repeated to have a protection on the entire tank. Both half protections are then held to each other by natural silicone bonding. Thus, a high pressure storage tank coated with a silicone material wherein ATH is incorporated is obtained (FIG. 2).

IV. Additional Treatment of the Tank Coated with the Material According to the Invention Intumescent paint such as Pacfire paint from Innovative Fire Systems can be placed onto the high pressure storage tank coated with the material according to the present invention.

This paint enables a protective barrier to be obtained by creating an expanded carbon layer, thus possessing a very strong thermal barrier effect.

The implementation of painting is made by simple paintbrush application taking care beforehand to use GE SILICON SS4004, a primary coat promoting adhesion. This primary coat may also be useful to maximise bonding between silicone and composite of the tank.

The invention claimed is:

1. A process for preparing a fire-proof material for a high pressure storage tank, the fire-proof material including a matrix of thermosetting elastomeric resin in which endothermic fillers are incorporated, the matrix of thermosetting elastomeric resin being a matrix of silicone resin, comprising the following steps:
a) preparing, at room temperature, a mixture including at least one precursor of the thermosetting elastomeric resin and at least one endothermic filler by gradually adding the at least one endothermic filler to the at least one precursor of the thermosetting elastomeric resin whereby a homogeneous dispersion is obtained;
b) adding, to the mixture obtained in step a), an agent enabling the thermosetting elastomeric resin to be obtained from the at least one precursor, wherein the adding of the agent is performed at room temperature; and
c) cold shaping the mixture obtained in step b) by casting, injection, or vacuum assisted transfer, into a mold on the high pressure storage tank to obtain the fire-proof material including the matrix of thermosetting elastomeric resin in which the endothermic fillers are incorporated.

2. A high pressure storage tank having an external surface only partially covered with the fire-proof material prepared by the process according to claim 1,
wherein the high pressure storage tank is a type IV tank, and
wherein at least one portion of the external surface of the high pressure storage tank not covered by the fire-proof material is either uncovered by any material or coated with a meltable material.

3. The high pressure storage tank according to claim 2, wherein the external surface of said high pressure storage tank is at least partially covered with an intumescent substance.

4. The high pressure storage tank according to claim 3, wherein at least one zone of the intumescent substance is replaced by a meltable material.

5. The high pressure storage tank according to claim 2, wherein the external surface of said high pressure storage tank is at least partially covered with a fire inert insulating material, the fire inert insulating material being in the form of a fabric or sock configured to cover said high pressure storage tank.

6. The high pressure storage tank according to claim 5, wherein said fire inert insulating material is covered with an intumescent substance.

7. A process for protecting a high pressure storage tank, comprising:
applying the fire-proof material according to claim 1 on only a portion of the external surface of the high pressure storage tank,
wherein the high pressure storage tank is a type IV tank.

8. The process according to claim 7, further comprising:
applying an intumescent substance on all or part of the external surface of the high pressure storage tank, only the portion of the external surface of which is covered by the fire-proof material.

9. The process according to claim 8, further comprising:
replacing at least one zone of the fire-proof material with a meltable material.

10. The process according to claim 9, further comprising:
coating the high pressure storage tank, only the portion of the external surface of which is covered with the fire-proof material, with a fire inert insulating material.

11. The process according to claim 10, further comprising:
applying an adequate adhesion primary coat or surface treatment on all or part of the external surface of the high pressure storage tank, or the fire inert insulating material.

12. The process according to claim 10, wherein all or part of the external surface of the high pressure storage tank is covered with a meltable material.

13. The process according to claim 12, further comprising:
applying an adequate adhesion primary coat or surface treatment on all or part of the external surface of the high pressure storage tank, the meltable material, or the fire inert insulating material.

14. The process according to claim 9, further comprising:
applying an adequate adhesion primary coat or surface treatment on all or part of the external surface of the high pressure storage tank, or the meltable material.

15. The process according to claim 9, further comprising:
covering the fire-proof material with an intumescent substance.

16. The process according to claim 8, further comprising:
applying an adequate adhesion primary coat or surface treatment on all or part of the external surface of the high pressure storage tank.

17. The process according to claim 7, further comprising:
replacing at least one zone of the fire-proof material with a meltable material.

18. The process according to claim 17, further comprising:
applying an adequate adhesion primary coat or surface treatment on all or part of the external surface of the high pressure storage tank, or the meltable material.

19. The process according to claim 17, further comprising:
covering the fire-proof material with an intumescent substance.

20. The process according to claim 7, further comprising:
coating the high pressure storage tank, only the portion of the external surface of which is covered with the fire-proof material, with a fire inert insulating material.

21. The process according to claim 20, further comprising:
applying an adequate adhesion primary coat or surface treatment on all or part of the external surface of the high pressure storage tank, or the fire inert insulating material.

22. The process according to claim 20, wherein all or part of the external surface of the high pressure storage tank is covered with a meltable material.

23. The process according to claim 22, further comprising:
applying an adequate adhesion primary coat or surface treatment on all or part of the external surface of the high pressure storage tank, the meltable material, or the fire inert insulating material.

24. The process according to claim 7, further comprising:
applying an adequate adhesion primary coat or surface treatment on all or part of the external surface of the high pressure storage tank.

25. The process according to claim 1, further comprising:
before step b), outgassing the mixture obtained in step a) to obtain an outgassed mixture, wherein the agent enabling the thermosetting elastomeric resin to be obtained is added to the outgassed mixture.

26. The process according to claim 25, further comprising:
before step c), outgassing the mixture obtained in step b) to obtain an outgassed thermosetting elastomeric resin mixture, wherein the cold shaping is performed on the outgassed thermosetting elastomeric resin mixture.

27. The process according to claim 26, wherein an amount of the endothermic fillers expressed in weight with respect to a total weight of material of the thermosetting elastomeric resin is between 15% and 80%.

28. The process according to claim 27, wherein the amount of said endothermic fillers expressed in weight with respect to the total weight of material of the thermosetting elastomeric resin is between 40% and 70%.

29. The process according to claim 1, wherein the endothermic fillers are selected from aluminum trihydroxide (ATH), disodium tetraborate decahydrate (or borax), trisodium phosphate dodecahydrate, magnesium dihydroxide (or Brucite), Colemanite, a melamine monophosphate, a melamine pyrophosphate, a melamine polyphosphate zinc borate, hydromagnesite, a tripolyphosphate (TPP), resorcinol bis(diphenyl phosphate) CRDP), bisphenol-A bis(diphenyl phosphate) (BPADP), and mixtures thereof.

30. The process according to claim 1, wherein an amount of the endothermic fillers expressed in weight with respect to a total weight of material of the thermosetting elastomeric resin is between 10% and 90%.

31. The process according to claim 1, further comprising:
outgassing the mixture obtained in step c) to obtained an outgassed mixture,
wherein the cold shaping is performed on the outgassed mixture.

* * * * *